Feb. 16, 1926.
J. W. LEGG
1,572,940
TRANSMISSION DYNAMOMETER
Filed Jan. 14, 1921
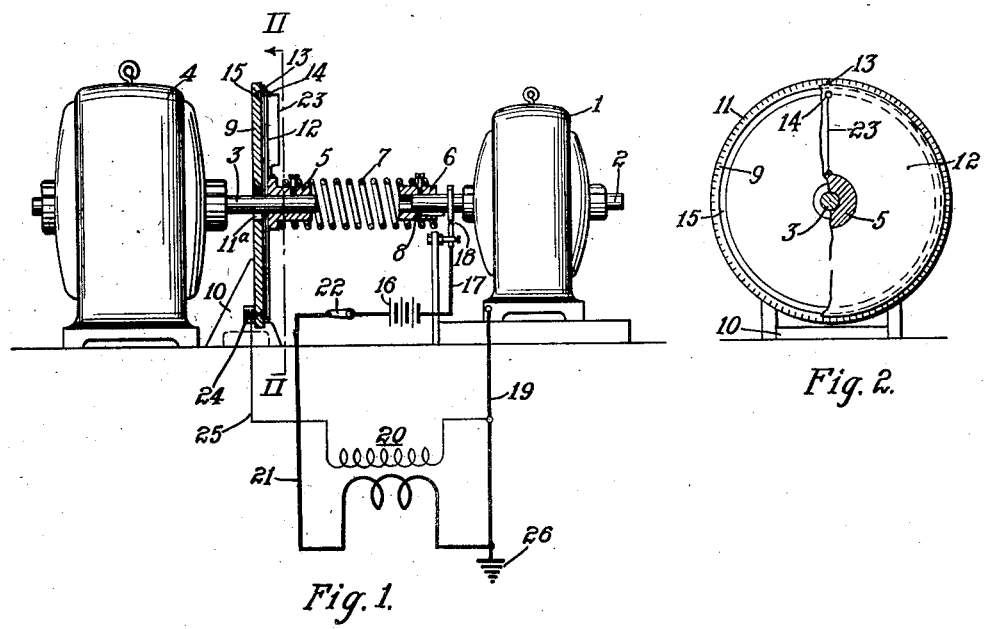
Fig. 1.
Fig. 2.
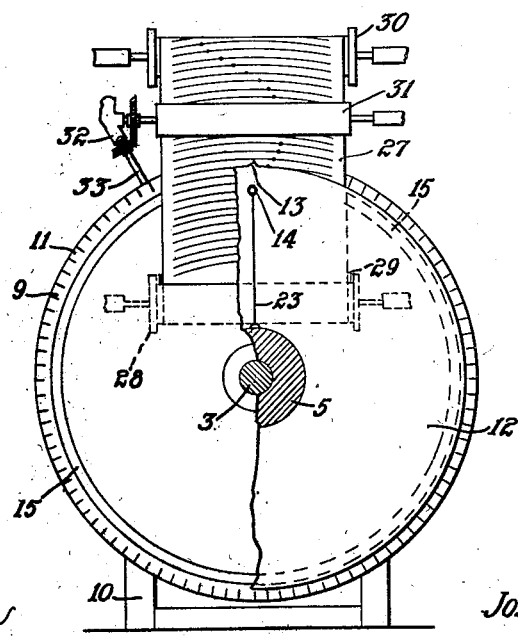
Fig. 3.
WITNESSES:
H. J. Shelhamer
Marshall Low
INVENTOR
Joseph W. Legg
BY
Wesley G. Carr
ATTORNEY Patented Feb. 16, 1926.

1,572,940

UNITED STATES PATENT OFFICE.

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSMISSION DYNAMOMETER.

Application filed January 14, 1921. Serial No. 437,171.

*To all whom it may concern:*

Be it known that I, JOSEPH W. LEGG, a citizen of the United States, and a resident of Wilkinsburg, in the county of Allegheny and State of Pennsylvania, have invented a new and useful Improvement in Transmission Dynamometers, of which the following is a specification.

My invention relates to transmission dynamometers and it has particular relation to devices of the character described that are adapted to be employed to determine the torque of rotating machines.

One of the objects of my invention is to provide a means for determining the amount of the opposition that a machine will exert against any action which tends to accelerate or retard the rotation thereof with respect to a predetermined speed, which opposing force will be hereinafter termed either positive or negative torque.

Another object of my invention is to provide a dynamometer by means of which the positive or negative torque of a dynamo-electric machine or other prime mover may be indicated upon a calibrated dial by means of an electric spark.

Another object of my invention is to provide a device of the class described that may be caused to indicate the torque of an electric motor from zero to maximum speed by means of a rapid succession of electric sparks, one occurring upon each rotation of the motor shaft.

A further object of my invention is to provide a dynamometer, the dial of which may be illuminated at the proper point, to enable the operator to quickly and easily read the amount of the torque of the machine being tested, as indicated upon the dial.

Another object of my invention is to provide a device of the character designated that shall be adapted to record the torque characteristics of a dynamo-electric machine in permanent form for future examination and comparison.

In the accompanying drawings,

Figure 1 is a side elevational view of a dynamometer constructed in accordance with my invention and shown as coupled between two dynamo-electric machines, one of which is to be tested.

Fig. 2 is a vertical transverse section, taken on line II—II of Fig. 1, illustrating the calibrated dial and a contact-carrying-and-indicating disk, a portion of which is broken away to more clearly show the annular contact member carried by the dial.

Fig. 3 is a view similar to that shown in Fig. 2 but on a larger scale and illustrating a graduated strip of paper or chart disposed in the path of the sparking elements to obtain a permanent record of the torque characteristics of the machine being tested.

Referring to the drawings, a machine, which is illustrated as an electric motor 1, is to be tested to determine the amount of the torque thereof. The motor 1 is provided with a shaft 2 and is preferably disposed in axial alinement with the shaft 3 of a dynamo-electric machine 4 having a larger capacity than the motor 1.

The machine 4 may be either a motor or a generator but is preferably a direct-current, variable-speed motor, the speed of rotation of which may be adjusted to oppose any change in the speed of the motor 1. The machine 4, therefore, functions as a speed regulator or governor for the machine 1.

A collar 5 is fixed to the end of the shaft 3 of the machine 4 adjacent to the motor 1 and is yieldably connected to a similar collar 6 carried by the shaft 2 of the motor 1, by means of a coiled spring 7, the torsional characteristics of which have been predetermined. The collar 6 is mounted for axial movement upon the shaft 2 by means of a spline or feather key 8 to compensate for any contraction or expansion of the spring during the operation of the machine.

A disc 9, of insulating material is mounted upon a base 10 adjacent to the collar 5 and is provided with a centrally disposed aperture 11ª through which extends the shaft 3 of the machine 4. The disc 9 is further provided with a scale 11 adjacent to the periphery thereof which may be suitably calibrated to indicate, in foot pounds, the positive or negative torque of the motor being tested, when used in connection with flexible means of known torsional characteristics.

A disc 12, also of insulating material, is fixed to the collar 5 and is provided with a pointer 13 which co-operates with the stationary scale 11. It will be apparent that an arm provided with a pointer may be utilized for this purpose but a disc, such as that described, is preferably employed by reason of the fact that it reduces the friction caused by windage and also shades the eyes of the operator from the glare of the indicating spark.

The disc 12 is also provided with a sparking electrode 14 adjacent to the pointer 13 and is adapted to co-operate with an annular electrode 15 that is mounted in the face of the stationary insulating disc 9 and is spaced from, and disposed adjacent to the path of, the rotatable electrode 14. An electric spark is established across the gap thus formed once every rotation of the shaft 2 by means of the following circuit.

The current from one terminal of a battery 16 flows through a conductor 17 to a rotating make-and-break contact device 18 carried by the shaft 2 of the motor 1 from whence it intermittently flows through the frame of the motor 1, conductor 19, primary winding of an induction coil 20, conductor 21 and switch 22 to the other terminal of the battery. The flow of current through the circuit just outlined induces a current, in the usual manner, in the secondary winding of the induction coil 20, which flows through the conductor 19, the casing of the motor 1, the shaft 2 and the yieldable connecting elements to the collar 5 from whence it flows through a conductor 23 to the electrode 14. When the circuit is broken by the contact device 18, the current thus induced discharges across the gap between the electrode 14 and the annular electrode 15 in the form of a spark and illuminates the face of the dial adjacent to the point thereon designated by the indicator 13. The current then flows, through the annular electrode 15, binding post 24 and a conductor 25, to the coil 20.

Both of the circuits thus outlined may be provided with a common ground connection 26 to prevent an excess of potential from being built up in the circuit.

If it is desired to ascertain the amount of the positive torque of the motor 1, the operation of the machine is as follows: The motor 1 is started and the machine 4 is so energized as to have a tendency to rotate at a slower speed than the motor 1. The motor 1 will then accelerate the rotation of the machine 4 which, therefore, will function as a generator and retard the action of the motor 1. This braking action of the machine 4, upon the rotation of the shaft 2, causes the distortion of the spring 7 and a consequent lagging of the pointer 13 with respect to its normal position. The resulting retarding action exerted by the variable-speed machine 4 in opposition to that of the motor 1 may be regulated at the will of the operator according to the estimated torque, speed or other characteristics peculiar to the particular type of machine being tested.

If, on the other hand, it is desired to ascertain the negative torque of the motor 1, the same is energized to rotate at a certain speed and the machine 4 is energized to have a tendency to operate at a greater speed. The machine 4, therefore, will accelerate the speed of the motor 1, and the latter will oppose the rotation of the machine 4 and functions as a generator. The retardation thus exerted by the motor 1 upon the machine 4 will exert a torsional force upon the spring 7 which will effect a consequent deflection of the pointer 13 in the opposite direction.

It will be apparent that, if the motor 1 and the machine 4 are both so operated as to give the machines the same speed, there will be no torsional force exerted upon the spring 7 and the pointer 13 will remain in its zero position throughout the operation.

From the above description, it will be noted that the machine 4 will have the effect of a speed regulator or governor, and, being of a larger capacity than the motor 1, will tend, at all times, to cause the motor 1 to operate in synchronism therewith. That is, if the machine 4 is adjusted to operate at a certain speed, the machine 1 may be adjusted to run at a greater or slower speed and the machine 4 will, in either case, oppose the machine 1 and tend to bring the latter into synchronism with the machine 4.

When the switch 22 is in its closed position, a spark will be caused to occur between the electrodes 14 and 15 once every rotation of the shaft 2, by the contact device 18. The spark thus formed is in alinement with the position of the pointer 13 with respect to the dial 11 and not only indicates the position of the rapidly rotating pointer 13 at the breaking of contacts 18 but illuminates the face of the dial adjacent thereto.

A tachometer may be attached to the shaft 2 of the motor 1, and the torque of the motor, as indicated upon the dial, may be compared with the rotations per minute of the shaft 2 at any particular speed. The switch 22 may be normally maintained in an open position and be closed when it is desired to determine the torque of the machine at a certain number of revolutions per minute.

In Fig. 3 of the drawing, I have illustrated means for obtaining a graphic record of the torque characteristics of a motor at speeds ranging from zero to maximum, which may be preserved for future examination and comparison. A strip of paper 27, or other suitable material, is shown as being wound upon a lower spool 28 from which it passes upwardly through a slot 29 and between the disc 12 and the dial 11, and is wound upon a similar spool 30.

The paper may be fed across the path of the electrode 14 in any desired manner, either manually or mechanically. The paper 27 may be provided with arcuate lines, each having a radius substantially equal to the distance from the center of the shaft 3 to the center of the electrode 14. The arcuate lines may be graduated in revolutions per minute, progressing from zero speed to full speed. As the paper moves, thus bringing the arcuate lines successively opposite the path of the electrode, the operator adjusts the speed of the machines 1 and 4 accordingly and, at each different speed, when the switch 22 is closed, the spark will puncture the paper in accordance with the change in its displacement at that speed. Thus, a record, as shown by the dots on the arcuate lines, will be made of the torque at each different speed, the value of which torque is determined by the portion of the puncture mark along the line representing the speed at the time the mark was made.

In the drawing, I have shown a roller 31 adapted to frictionally engage the surface of the paper to feed it upwardly and the roller is actuated by means of suitable gearing 32 and a shaft 33 actuated by the shaft 3 of the motor through the medium of suitable reduction gearing, not shown.

With this arrangement, the paper is moved in proportion to the speed of the machines and the paper 27 may accordingly be marked at its edges to represent time intervals, instead of speeds, as in the above described operation. Thus, if the switch 22 be closed automatically at equal intervals of time, by any suitable means (not shown), the longitudinal distance between the puncture marks is proportional to speed, and the distance across the paper between the puncture marks and the zero position of the pointer is proportional to torque.

By my invention, a complete record of the torque characteristics of the motor may be graphically obtained, over a range from full speed in one direction to full speed in the opposite direction, and also the amount of the torque which resists any tendency to accelerate the speed thereof is recorded in permanent form for future study and comparison. If operated manually, the switch 22 may be normally left open and the paper adjusted with the line representing the desired revolutions per minute in a position coinciding with the path of the electrode 14.

As soon as the tachometer reading corresponds to that indicated upon the paper strip, the switch 22 is closed, which causes a spark to jump between the electrodes 14 and 15 to perforate the chart at a position indicating the torque of the motor at that particular speed. This operation may be periodically repeated when the machine attains certain speeds or revolutions per minute until a complete record of the torque of the motor is indicated graphically upon the chart.

My invention is not limited to the specific structures illustrated as it is adapted to be variously modified without departing from the spirit and scope of the invention, as set forth in the appended claims.

I claim as my invention:

1. In a dynamometer, the combination with a plurality of relatively movable members and yieldable connecting means therebetween, of indicating means comprising a circuit including a space-discharge electrode moved in accordance with the movement of one of said members, a stationary co-operating electrode conforming to the path of movement of said movable electrode in spaced relation thereto, and means actuated by the other member for controlling the energization of said circuit.

2. In a dynamometer, the combination with a pair of axially alined rotatable members and yieldable connecting means therebetween, of indicating means comprising a circuit including a space-discharge electrode rotated in accordance with the rotation of one of said members, a stationary electrode having a co-operating circular space-discharge portion conforming to the path of movement of said movable electrode in spaced relation thereto and a circuit-making-and-breaking device actuated by the other rotatable member.

3. A dynamometer comprising a pair of axially alined shafts, yieldable connecting means therebetween including a collar fixed to one of said shafts, a collar longitudinally-slidably keyed to the other shaft and a spring connecting said collars, a space-discharge electrode carried by said fixed collar, a stationary electrode having a portion conforming to the path of movement of said movable electrode in spaced relation thereto. and means on said other shaft for controlling space discharges between said electrodes.

4. A dynamometer comprising a rotatable device to affect the speed of operation of a machine to be tested, means for yieldably connecting said device to said machine, a scale member provided with a sparking electrode, an indicating member for co-operation with said scale member and provided with a sparking electrode adapted to co-operate with the first mentioned electrode, one of said members being carried by said connecting means and the other being stationary relative thereto, and means for establishing electric sparks between said electrodes at time intervals determined by the speed of the machine.

5. A dynamometer comprising means including a rotatable member adapted to vary the speed of operation of a machine to be tested, means for yieldably connecting said member to said machine, a rotatable sparking electrode carried by said connecting means, a stationary scale mounted adjacent to said rotatable electrode, an annular sparking electrode carried by said scale and disposed adjacent to the path of said rotatable electrode, and means connected to said electrodes across said yieldable connecting means and controlled in accordance with the operation of the machine for intermittently establishing an electric spark between said electrodes to indicate upon said scale the amount of the torque exerted by said machine upon said braking device.

6. A dynamometer comprising a rotatable member adapted to vary the speed of operation of a machine to be tested, means for yieldably connecting said rotatable member to said machine, a stationary dial mounted adjacent to said retarding means, a rotatable indicating member mounted on said retarding member for co-operation with said dial, means connected to said electrodes across said yieldable connecting means and controlled in accordance with the operation of the machine, adapted to cause an electric spark to occur adjacent to said indicating member, and a chart disposed in the path of said spark.

7. In a dynamometer, the combination with a pair of axially alined shafts and yieldable connecting means therebetween, of a discoidal member carried by one of said shafts having a pointer element adjacent to its perimeter and carrying a sparking electrode on one surface, a stationary similar member disposed in slightly-spaced parallel relation to said surface having an annular scale outside the perimeter of the other member and an annular co-operating electrode on its inner surface inside said scale, and means on said other shaft for controlling discharges between said electrodes.

In testimony whereof, I have hereunto subscribed my name this 5th day of January, 1921.

JOSEPH W. LEGG.